United States Patent Office 3,414,511
Patented Dec. 3, 1968

3,414,511
METHOD OF REMOVING OIL FROM POLLUTED WATER USING EXPANDED VERMICULITE
Donald O. Hitzman, Bartlesville, Okla., assignor to Phillips Petroleum Company, a corporation of Delaware
No Drawing. Filed Mar. 10, 1967, Ser. No. 622,097
8 Claims. (Cl. 210—40)

ABSTRACT OF THE DISCLOSURE

Exfoliated vermiculite is floated on oil polluted water to absorb oil which is removed from the water by skimming the vermiculite from the water.

REMOVAL OF OIL POLLUTED WATER USING EXPANDED VERMICULITE

This invention relates to the removal of oil from water. It also relates to the supply of an oil from water removal agent.

In one of its aspects, the invention relates to the removal of oil or oil film from water polluted therewith employing expanded vermiculite, that is to say, an exfoliated hydrated magnesium-aluminum-iron silicate. In another of its aspects, the invention relates to a method of preparing particularly useful expanded vermiculite and the use thereof to remove oil from water polluted therewith.

According to a concept of the invention, it provides a method for the removal of oil from the surface of water polluted therewith by placing the vermiculite which has been expanded into contact with the oil on or in the water. According to another concept of the invention, the vermiculite can be at least partly if not wholly expanded at or near the site of its utilization thus providing essentially nascent vermiculite in highly active state for the operation. In another concept of the invention, it provides a method wherein expanded vermiculite and oil polluted water are brought together into intimate contact, a layer of vermiculite now containing oil which it has adsorbed from the water is allowed to form, and the layer is removed from the surface of the water.

It is well known that natural water resources are being increasingly taxed by population growth and the considerably expanded and still expanding industrial effort being made. It is also known that there is great need for increasingly effective methods and alternative effective methods for treating polluted waters to absorb therefrom polluting materials. One of the worst offenders when it is allowed to pollute water is oil. There have been suggested various operations for the removal of oil from water.

Various materials have been suggested for the purification of water by removing oil or oily matter therefrom as in connection with condensing steam plants wherein oil is removed from condensed steam so that the water may be used again in the boiler without any of the harmful effects which are experienced when oily feed water is used in steam boilers. Oil separators which act upon exhaust steam from steam engines, pumps and the like have been used. The production of flocculent precipitates which in settling may gather up and carry down with them the oil in the water has been tried. Other operations for removing oil from water are known to the art. Particularly, materials such as magnesite, dolomite, serpentine, olivine, asbestos, and allied materials and asbestic rock, especially the fibrous variety of serpentine termed "chrysotile" which is commonly considered one form of asbestos and which are insoluble or only sparingly soluble in water had been advocated for removal of oil from water. The use of chrysotile either in a finely divided or in a tufty condition has also been disclosed. In purifying oily water by means of these substances, the purifying material is stated to be mixed in with the water which is then thoroughly agitated. The agitation is stated to bring the particles of the magnesium body into intimate contact with the particles of oil carried by the water, and these oil particles are gathered up by the particles of the purifying material. The purifying material, with the oil carried by it, may then be removed from the water either by means of filters or by allowing the solid matter to settle and drawing off the water. In such a process it is disclosed to be essential that the water shall be agitated so as to bring the purifying material into contact with all of the oil particles in the water. U.S. Patent 705,253, dated July 22, 1902, includes information as here discussed.

I have now discovered that expanded vermiculite upon contact with oil polluted water very effectively will remove therefrom the oil. Thus, simply spreading expanded vermiculite upon the surface of a settling pond will quickly remove oil films therefrom. For example, the effluent from processes or from settling ponds can be passed through a sluice wherein is retained a layer of expanded vermiculite which floats on the water. The vermiculite absorbs the oil and the water passes on substantially free from oil. Also, effluents can be passed through fixed beds of expanded vermiculite. Bodies of water that are contaminated, such as ponds and the like, can be treated by simply spreading expanded vermiculite on the surface whereupon the expanded vermiculite which has become loaded with oily matter or residues can be skimmed from the water surface. Even when following a procedure which involves agitation of a slurry of expanded vermiculite and oil contaminated water the expanded vermiculite of the invention can be employed since this vermiculite when so used will float upon the surface of the water when it has allowed to bcome quiescent.

Further, the oil loaded expanded vermiculite can be treated in various ways for recovery of the oil therefrom. Still further, the oil containing expanded vermiculite can be burned as a fuel, in effect burning the oil from the vermiculite; also, the used vermiculite can be employed as a soil conditioner.

It is an object of this invention to provide a method for the removal of oil or oily contaminants from water. It is another object of this invention to provide a method for conditioning a material for the removal of oil or oily materials from water contaminated therewith. It is a still further object of the invention to provide a method for the recovery for possible reuse of a material which has been used for the removal of oil or oily substances from water contaminated therewith.

Other aspects, concepts and objects of the invention are apparent from a study of this disclosure and the claims.

According to the present invention, oil is removed from water contaminated therewith by contacting the oil contaminated water with expanded vermiculite. Further, according to the invention, the expanded vermiculite need be merely floated upon the oil contaminated water and the vermiculite layer separated from the water to effectively separate the oil from the water. This is so whether the water is drawn off from beneath the vermiculite layer or whether the vermiculite layer is skimmed from the water surface.

The method of the invention can be effected at any temperature at which liquid water exists. Ordinarily, the operation is effected at atmospheric pressure. However, elevated pressures can be employed. The time of contact of the expanded vermiculite with the oil contaminated water will depend somewhat upon the degree of purification desired to be obtained.

One form of expanded vermiculite is set forth and described as to its properties in "Vermiculite—The Wonder Mineral" published by Zonolite Division, W. R. Grace & Co., 135 South La Salle Street, Chicago 3, Ill. This publication is in the nature of a bulletin and is further identified as G–201 Revised 1961 and 1963. The properties of the four grades of expanded vermiculite given in Table II hereof are found on page 3 of the bulletin.

The optimum amount of each grade of expanded vermiculite to be employed per amount of oil for each kind of oil for each embodiment of this process, taking into account the volume of water, can readily be determined by mere mixture test by one skilled in the art. I generally prefer to employ a substantial excess of expanded vermiculite over the minimum actually needed to absorb the oil because the process is thus speeded up, and because the expanded vermiculite is relatively cheap.

The expanded vermiculite that can be employed in my process can be any exfoliated hydrated magnesium-aluminum-iron silicate $$[(H_2O)-(Mg,Ca,K)-(Al,Fe,Mg)-(Si,Al,Fe)_4O_{10}(OH)_2]$$

Such materials are readily available from commercial sources or can be produced by heating the micaceous mineral, vermiculite.

The process of this invention is clearly superior to prior art processes, such as disclosed by U.S. 705,253, as is demonstrated by the following examples.

EXAMPLE 1

To each of 5 beakers that contained 200 cc. of tap water per beaker was added 1 cc. of Smackover crude oil. This amount of oil formed a complete layer of oil on the surface of the water and closely simulated an oil coated pond. One gram increments of each of the following materials were then added to the oil polluted water until the surface was free of oil. If possible, each increment was removed before the next increment was added. The following table presents the results of these runs.

TABLE I

| Material | Amount required to substantially remove oil | Remarks |
|---|---|---|
| Expanded Vermiculite No. 1.[1] | 6.0 | Slight oil film remaining. |
| Expanded Vermiculite No. 2. | 2.5 | Trace of oil film remaining. |
| Expanded Vermiculite No. 3. | 2.0 | Water was oil free. |
| Expanded Vermiculite No. 4. | 1.0 | Do. |
| Fibrous Asbestos (tufted) | 5.0 | Oil sank with asbestos fibers but floated free on slight agitation. |

[1] Expanded vermiculites have the following characteristics measured by A.S.T.M. (C-29) loose shoveling procedure (as in Table II).

The samples of expanded vermiculite absorbed the oil and were readily skimmed off the water. The oil remained on the vermiculite. The asbestos fibers sank through the oil and water and trapped some oil. However, the asbestos did not hold the oil. Further, the asbestos tended to remain in suspension, and it caused the water to be cloudy while the expanded vermiculite floated, leaving the water clear.

The water, oil, and materials used in each run were again combined. Each mixture was then shaken. The oil coated vermiculite retained the oil and floated free of clean water, but the asbestos did not retain the oil which floated while the asbestos sank.

These runs clearly show that expanded vermiculite readily removes oil contamination from water while materials of prior art disclosure such as "tufty" asbestos are not at all suitable.

The runs of this example also demonstrate that the finer grades of expanded vermiculite are preferable for many applications of the method of the invention because their greater surface area absorbs more oil.

EXAMPLE 2

The runs of Example 1 were repeated employing Burbank crude oil in place of Smackover crude oil. Quite similar results were obtained except that a lesser expanded vermiculite could be used because Burbank crude is a thinner material and absorption is more efficient. The asbestos was again useless, however.

TABLE II

| Grade | Density, lbs. per cu. ft. | Sieve, U.S.S. sieve size | Analysis (by weight), Cumulative percent retained | |
|---|---|---|---|---|
| | | | Maximum | Minimum |
| No. 1 | 4 to 7 | 3/8 | 10 | 0 |
| | | 4 | 60 | 30 |
| | | 8 | 95 | 65 |
| | | 16 | 100 | 85 |
| No. 2 | 4 to 8 | 4 | 5 | 0 |
| | | 8 | 80 | 20 |
| | | 16 | 99 | 75 |
| | | 30 | 100 | 90 |
| No. 3 | 5 to 9 | 8 | 10 | 0 |
| | | 16 | 60 | 20 |
| | | 30 | 95 | 65 |
| | | 50 | 98 | 75 |
| | | 100 | 100 | 90 |
| No. 4 | 6 to 10 | 16 | 5 | 0 |
| | | 30 | 65 | 15 |
| | | 50 | 98 | 60 |
| | | 100 | 100 | 90 |

Further according to the invention the vermiculite can be at least partly expanded or if completely expanded can be retreated by heat, etc. at the site of utilization, preferably just prior to utilization. This provides a "nascent" vermiculite material of particularly high effectiveness.

When the expanded vermiculite has been loaded with oil or oily substance and has been separated from the water it can then be treated as with a solvent or by retorting or other methods to recover the oil therefrom. The thus treated vermiculite can be immediately reused or it can be further treated as by heat to increase its capacity to absorb additional oil or oily substance from water.

Among the solvents which can be employed to remove oil or oily substances from the used expanded vermiculite are, of course, those solvents which one skilled in the art can determine will dissolve those substances. For example, light hydrocarbons such as gasoline or even kerosene can be used. Other solvents can be used. When a solvent has been used the vermiculite ordinarily will retain a substantial portion of solvent. The vermiculite can be reactivated for reuse by simply heating to recover the solvent as a vapor which can then be condensed and reused either directly or with intermediate purification as may be desired.

Further, the oily material can be steam distilled from the vermiculite as one skilled in the art having possession of this disclosure and having studied the same will understand.

Reasonable variation and modification are possible within the scope of the foregoing disclosure and the appended claims to the invention, the essence of which is that expanded vermiculite has been found to be particularly effective to remove oil and oily substances from water as by merely bringing the expanded vermiculite into contact with the oil or oily substance contaminating the water.

I claim:

1. A method for removing oil or oily substances contaminating water which comprises contacting said water with expanded vermiculite and then separating the expanded vermiculite and said water by removing said expanded vermiculite now containing said oil or oily substance from the surface of said water to recover water substantially freed from said oil or oily substances.

2. A method of removing oil or oily substance from water which comprises floating upon said water expanded vermiculite according to claim 1 and then skimming the thus floated vermiculite from said water.

3. A method for removing oil or oily substance from water contaminated therewith according to a method as described in claim 1 which comprises contacting expanded vermiculite with said water and removing the water from below a layer of said vermiculite thereupon.

4. A method according to claim 1 wherein the water and oil or oily substance contaminating same is contacted with a bed of expanded vermiculite and then the thus contacted water is removed from said bed.

5. A method for treating water according to claim 1 wherein the vermiculite is at last in part expanded just prior to contacting the same with the water.

6. A method according to claim 1 wherein the oil contaminated vermiculite is treated to remove at least a substantial amount of the oil therefrom and is then reused.

7. A method according to claim 6 wherein the vermiculite is solvent extracted to remove oil therefrom and is then heated to reactivate the same.

8. A method for recovering oil from the used expanded vermiculite according to claim 6 which comprises subjecting said vermiculite to steam distillation.

References Cited

UNITED STATES PATENTS

| | | | |
|---|---|---|---|
| 705,253 | 7/1902 | Krause | 210—40 X |
| 2,464,204 | 3/1949 | Baker | 210—40 X |
| 3,147,216 | 9/1964 | Oemler | 210—40 |
| 3,210,272 | 10/1965 | Foster et al. | 210—39 |
| 3,215,623 | 11/1965 | Hix | 210—24 |
| 3,224,965 | 12/1965 | Woolery | 210—24 |
| 3,265,616 | 8/1966 | Wyllie et al. | 210—39 |

REUBEN FRIEDMAN, *Primary Examiner.*

J. DE CESARE, *Assistant Examiner.*